Patented Mar. 9, 1954

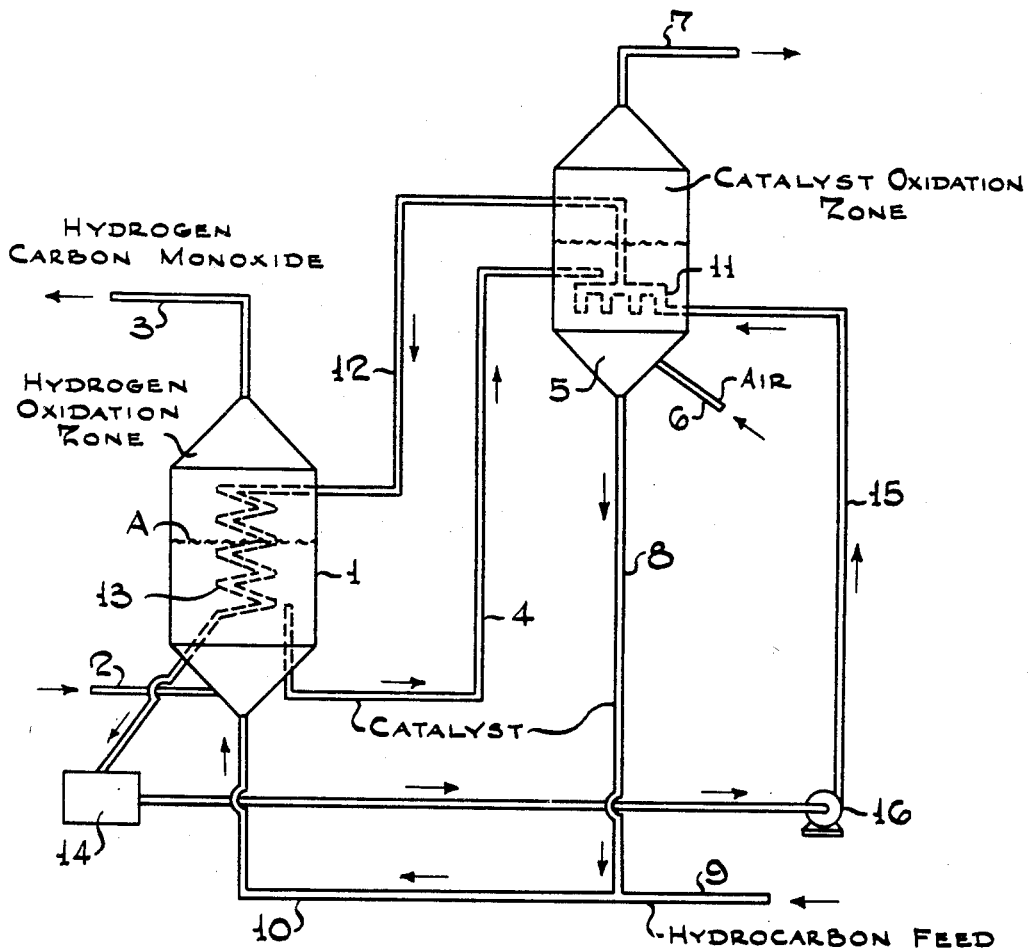

2,671,720

UNITED STATES PATENT OFFICE 2,671,720

PRODUCTION OF HYDROCARBON SYNTHESIS GAS

Warren K. Lewis, Newton, and Edwin R. Gilliland, Arlington, Mass., assignors to Standard Oil Development Company, a corporation of Delaware Application August 3, 1946, Serial No. 688,352

10 Claims. (Cl. 48—196)

The present invention relates to a hydrocarbon synthesis process. It is more particularly concerned with an improved process for the preparation of the feed synthesis gases. In accordance with the present invention substantial improvements are secured by controlling the character of the catalyst employed with respect to the feed gases. Furthermore, in accordance with this invention substantial economies are secured by utilizing a novel operating technique wherein the heat evolved in one reaction zone is economically utilized in the other. These novel operating techniques, coordinated with the control of the catalysts, result in substantial improvements in a process for the production of feed gases suitable for a hydrocarbon synthesis reaction.

It is well known in the art to conduct hydrocarbon synthesis reactions by contacting hydrogen and oxides of carbon with catalysts under various temperature and pressure conditions. The catalyst employed is usually selected from the iron group metals, as, for example, iron, cobalt, and nickel. The catalysts are utilized either alone or on suitable carriers, such as kieselguhr, diatomaceous earth, synthetic gels, silica, and alumina. Promoters such as oxides of chromium, zinc, aluminum, magnesium, and the rare earth metals are used with the iron group metals. These catalysts are employed either in fixed bed or in fluid catalysts operations.

The temperatures employed in the synthesis reaction vary widely as, for example, in the range from about 300° F. to about 800° F. and are generally in the range from about 350° F. to about 700° F. The pressures likewise vary considerably and are a function of other operating conditions, such as catalyst employed, activity of the catalyst, character of the feed gases, and the temperatures utilized. Pressures in the range from about 1 to 100 and higher atmospheres have been suggested. The character of the feed gases introduced into the synthesis reaction zone depends somewhat on the particular temperatures and pressures and upon the catalyst employed. For example, when employing iron type catalysts, it is preferred to use about 1 mol of carbon monoxide to about 2 mols of hydrogen, while when a cobalt catalyst is utilized equal mols of hydrogen and carbon monoxide in the feed synthesis gases are desirable.

Our invention is particularly concerned with the production of a mixture of hydrogen and carbon monoxide from hydrocarbons, particularly methane or from natural gas, and consists in oxidizing the hydrocarbons with a metal oxide. This procedure per se is old in the art. For example, U. S. Patent 1,899,184, issued to Martin De Simo, discloses the use of reducible metal oxides, such as oxides of iron, chromium, copper, nickel, manganese, and zinc for the oxidation of hydrocarbons comprising methane to produce hydrogen and oxides of carbon, particularly carbon monoxide. These reactions are generally conducted at temperatures in the range from about 950° to about 1,000° C.

We have now discovered that providing the character of the catalyst is controlled within the reaction zone, that is the zone where the synthesis gases are produced from hydrocarbons comprising methane, unexpected desirable results are secured. The important thing about the chemistry of our process is the fact that when a hydrocarbon gas or vapor, such as methane, reacts with a reducible metal oxide, such as FeO, both of two reactions occur. These reactions are as follows:

1. $FeO + CH_4 \rightarrow CO + 2H_2 + Fe$
2. $2FeO + CH_4 \rightarrow CO_2 + 2H_2 + 2Fe$ The first reaction is where one iron oxide reacts with one methane to form CO and two hydrogens and the second reaction is where two iron oxides react with one methane to form $CO_2$ and two hydrogens. These are relatively slow but the $CO_2$ reacts with some of the hydrogen very rapidly to form water and more CO as follows:

3. $CO_2 + H_2 \rightarrow H_2O + CO$

We do not desire either water or $CO_2$ left in the resultant product gas. Iron will not reduce either of these two gases beyond a certain fraction, very approximately, 50%. Consequently, some other means must be employed to eliminate the $CO_2$ and water vapor.

These gases can be eliminated by taking advantage of the fact that carbon at elevated temperatures in the following reaction:

4. $C + O \rightarrow CO$
5. $Fe + O \rightarrow FeO$
6. $H_2 + O \rightarrow H_2O$ has a far greater affinity for a single atom of oxygen to form CO than the affinity of either iron or of hydrogen for oxygen. Consequently, in any system in which we do not have in excess of one atom of total oxygen for one atom of total carbon we will secure these two elements combined as CO (plus excess carbon, if it be present), provided the reaction of formation of CO can be speeded up so that substantial equilibrium is achieved. In our process we propose to furnish at least one atom of carbon for each atom of oxygen combined with metal as reducible oxide entering the reaction zone. Assuming that the hydrocarbon is methane and that the metal oxide is FeO, we will have one or more mols of methane for each mol of FeO entering the reaction zone. The initial reaction between this methane and iron oxide will produce some $CO_2$ and water vapor and result, in consequence, in unreacted methane being left in the gaseous mixture. To eliminate the $CO_2$ and water vapor, we react them with this unreacted methane. These reactions are illustrated as follows:

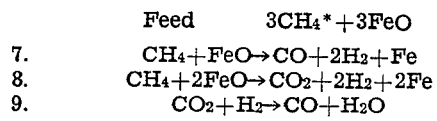

7. $CH_4 + FeO \rightarrow CO + 2H_2 + Fe$
8. $CH_4 + 2FeO \rightarrow CO_2 + 2H_2 + 2Fe$
9. $CO_2 + H_2 \rightarrow CO + H_2O$ Unreacted (1) $CH_4$ of feed.
Reforming reactions:

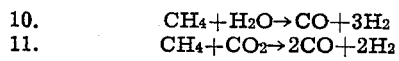

10. $CH_4 + H_2O \rightarrow CO + 3H_2$
11. $CH_4 + CO_2 \rightarrow 2CO + 2H_2$

* At least three mols.

These so-called reforming reactions, unfortunately, are very slow unless catalyzed with an effective catalyst. Iron, cobalt, nickel etc. are such catalysts. We, therefore, propose to admit to the reaction zone at least one mol of methane for each FeO added and provide in the reaction zone a large amount of active iron or nickel or equivalent for the completion of the desired reaction by catalysis of the reforming reaction. If we use excess methane relative to the FeO, practically all of it will be cracked to carbon and hydrogen. Obviously, the desirable thing is to use stoichiometrical proportions.

In the broad scope of our invention we admit substantially one atom of carbon for each atom of oxygen combined as reducible metal oxide in the reaction zone and provide in the reaction zone effective contact of the reacting gases with an amount of metal very large relative to the amount entering with the hydrocarbon as reducible oxide.

The amount of reducible metal oxide present in the reduction zone is negligible. This is possible because of the extraordinarily rapid rate of reaction between the reducible metal oxide and the hydrocarbon at the temperatures employed relative to the rate of the reforming reaction. In our process we secure as complete reaction between the metal oxide and the hydrocarbon in the line going to the reforming mass so as to leave as little reduction of metal oxide to be carried out in the reformer itself as possible.

The process of our invention may be readily understood by reference to the attached drawing illustrating one modification of the same. Hydrocarbon feed gases comprising methane are introduced into reaction zone 1 by means of line 2. These gases flow upwardly through reaction zone 1 and contact a solid fluid catalyst, the upper level of which is maintained at point A. Temperature and pressure conditions in reaction zone 1 are maintained in the range to secure this desired reaction. The product gases comprising hydrogen and carbon monoxide are removed overhead from reaction zone 1 by means of line 3 and handled in any manner desirable. Generally these gases are fed directly to a hydrocarbon synthesis zone under conditions to produce hydrocarbon constituents.

In accordance with the process of our invention we maintain a relatively large volume of catalyst in reaction zone 1. For the purpose of illustration it is assumed that the catalyst in reaction zone 1 comprises an iron type catalyst. In accordance with our invention we maintain the iron type catalyst or at least the greatest proportion of said catalyst in the reaction zone in the form of metallic iron. We accomplish this by withdrawing from reaction zone 1 a relatively small proportion of the catalyst by means of line 4 and passing the same to oxidation zone 5. In zone 5 the relatively small proportion of the iron catalyst which was withdrawn is oxidized by means of an oxygen containing gas or pure oxygen which is introduced into zone 5 by means of line 6. For the purpose of illustration it is assumed that the oxygen containing gas introduced by means of line 6 comprises air. The combustion gases are withdrawn from zone 5 by means of line 7 and disposed of in any manner desirable. The oxidized catalyst is removed from zone 5 by means of line 8 and mixed with additional feed hydrocarbons which are introduced by means of line 9. The catalyst, together with the additional feed hydrocarbons comprising methane, are returned to reaction zone 1 by means of line 10.

In accordance with the preferred modification of our invention, we absorb the heat evolved in reaction zone 5 in a transfer medium and transfer this heat by the medium to the gas producing zone 1. For the purpose of illustration it is assumed that the transfer medium comprises a fused salt circulating system. The heat evolved in reaction zone 5 is utilized to heat the salt in zone 11. The fused salt is removed from zone 5 by means of line 12 and passed through zone 13 in zone 1. The salt is cooled and the heat is utilized in the endothermic reaction occurring in reaction zone 1. The relatively cool fused salt is passed to surge tank 14 and then returned to zone 11 by means of line 15 and pump 16.

Our invention generally comprises controlling the character of the catalyst in the reaction zone in a manner that the greatest proportion of the catalyst in the reaction zone is in the form of a metal. A relatively small proportion of the catalyst is circulated to the oxidation zone. The amount of catalyst circulated to the oxidation zone is controlled in a manner so that one atom of oxygen, combined as reducible metal oxide, is introduced into the reaction zone per atom of carbon in the hydrocarbon gases. In accordance with a preferred modification of our invention the heat evolved in the oxidation zone is transferred to the reaction zone by means of a fused salt transfer medium.

The amount of catalyst we maintain in the form of a metal in the reaction zone may vary appreciably. In general, we prefer to have at least 70%, and preferably 90 to 95%, of the catalyst in the form of a metal.

A particularly desirable modification of the invention comprises the use of mixed metals as, for example, nickel and iron. When operating in this manner we prefer that approximately 90 to 95% of the catalyst by weight be nickel and that approximately 5 to 10% by weight of the catalyst comprise iron. Thus in an operation of this character the iron functions substantially as the oxygen carrier, while the nickel functions in the reaction zone as the reforming catalyst. A combination catalyst such as iron and cobalt may also be employed.

The temperatures maintained in the reaction zone may be in the range from about 1200° F. to about 2200° F. and the pressures in the range from 100 to 300 lbs./sq. in. In general, we prefer that the temperature be in the range from about 1700° F. to about 1900° F. and that the pressure be about 100 lbs./sq. in. The temperatures maintained in the oxidation zone are generally in the range from 1300° F. to 2300° F. and the pressure about atmospheric. Preferred temperature in the oxidation zone is about 1800° F. to 2000° F.

The fused salt or metal circulated may be any salt or metal which is liquid at operational temperatures and pressures. Satisfactory salts are, for example, sodium and potassium nitrates and nitrites. Suitable metals are, for example, molten sodium, bismuth, lead or tin.

The process of our invention is not to be limited by any theory as to mode of operation but only in and by the following claims in which it is desired to claim all novelty insofar as the prior art permits.

We claim:

1. Improved process for the production of carbon monoxide and hydrogen from hydrocarbon gases which comprises contacting hydrocarbon feed with a fluidized iron group metal catalyst selected from the class consisting of iron, cobalt and nickel, maintained in the form of a turbulent fluid bed within a reaction zone at an intermediate level by passing said hydrocarbon gas upwardly therethrough at such a velocity that said bed assumes a definite upper surface, maintaining the major portion of the catalyst in said reaction zone in the form of free metal particles with at most 30% of metal oxide, continuously circulating a relatively small percentage of said catalyst to an oxidation zone and back to said reaction zone at such a rate that substantially one atom of oxygen combined as reducible metal oxide is introduced into said reaction zone per atom of carbon in the total hydrocarbon feed, forming a suspension of said metal oxide at reaction temperature in at least part of said hydrocarbon feed in a reactant feed line and causing the rapid oxidation of the hydrocarbon in this suspension to a gas containing carbon dioxide and water vapor while reducing the reactant metal oxide therein to the form of solid particles of the free metal, thereafter introducing said suspension upwardly through the turbulent fluid bed of metal catalyst in said reaction zone and reforming the carbon dioxide and water vapor therein together with the remaining portion of said total hydrocarbon feed to produce a product gas consisting essentially of carbon monoxide and hydrogen.

2. Process in accordance with claim 1 in which the metal and metal oxide contained within said oxidation zone are maintained in the form of a turbulent fluid bed of solid particles partly filling said zone and heat evolved from said catalyst circulated to said oxidation zone, is transferred to the endothermic reaction zone by means of a heat transferring medium independent of said circulating metal oxide.

3. The process of claim 1 wherein said reaction zone is maintained at a superatmospheric pressure.

4. Improved process for the production of gases comprising carbon monoxide and hydrogen from hydrocarbon gases comprising methane which comprises contacting feed gases comprising methane with a fluidized iron-group metal catalyst maintained in the form of a turbulent fluid bed within a reaction zone by passing said gas upwardly therethrough at such a velocity that said bed assumes a definite upper surface, maintaining the major portion of the catalyst in said reaction zone in the form of particles of the free metal containing at most 30% of metal oxide, continuously circulating a relatively small percentage of said catalyst to an oxidation zone and back to said reaction zone at such a rate that substantially one atom of oxygen combined as reducible metal oxide is introduced into said reaction zone per atom of carbon in the hydrocarbon feed gases introduced thereto, bringing said oxide into contact with at least part of said methane feed gas to form a suspension in the reactant feed line, causing the complete reaction of methane in said suspension with at least part of said metal oxide to form carbon dioxide, steam and solid particles of reduced free metal, thereafter passing said suspension into the reaction zone and bringing it into effective contact therein with the relatively large amount of free metal catalyst in said turbulent fluid bed.

5. Process in accordance with claim 4 in which the catalyst is iron and the amount of iron maintained in the metallic state is in the range of about 90 to about 95% of metallic iron as compared to about 5 to about 10% of iron oxide.

6. A process in accordance with claim 4 in which said reduced metal catalyst is a composition comprising nickel and iron.

7. Process in accordance with claim 6 in which the amount of nickel in the catalyst comprises about 90 to 95% of nickel and about 5 to 10% of metallic iron by weight.

8. An improved process for the manufacture of gases comprising carbon monoxide and hydrogen from feed gases comprising methane which comprises mixing hot finely divided iron oxide and a methane-containing feed gas in a feed line at a temperature such that the mixture undergoes a rapid oxidation reaction therein resulting in the reduction of iron oxide to iron and the oxidation of methane to carbon dioxide and water vapor, thereafter passing the hot mixture thus produced to an externally unheated reaction zone, maintaining said reaction zone at a desired temperature under conditions to oxidize additional and unreacted methane to carbon monoxide and hydrogen by reaction with said carbon dioxide and water vapor while maintaining effective contact between the reacting gases and reduced iron oxide catalyst comprising at least 70% of free metallic iron, withdrawing a portion of said solid catalyst particles from said reaction zone and oxidizing the same in an oxidizing zone, absorbing the heat evolved in said oxidizing zone by a transfer medium maintained in a confined stream within a highly turbulent fluid bed of oxidized iron partly filling said oxidizing zone, simultaneously withdrawing hot iron oxide from said oxidizing zone for use in said methane oxidation reaction and passing said transfer medium to a heat transferring path maintained within a highly turbulent bed of iron catalyst partly filling said reaction zone, whereby the temperature of said reaction zone is maintained at the desired level.

9. The process of producing a gas consisting essentially of carbon monoxide and hydrogen which comprises combining in a reactant feed line a stream of hydrocarbon gases and finely divided solid particles of hot reducible metal oxide, the metal of which is capable of catalyzing the reforming reaction between hydrocarbon, carbon dioxide and steam to produce carbon monoxide and hydrogen, rapidly reacting said hydrocarbon with hot metal oxide in said line and producing by said reaction a mixture of carbon dioxide, steam and free particles of solid metal, feeding said reactants and mixed reaction products continuously through said line and introducing said mixture and additional hydrocarbon gases into a subsequent reaction zone which provides effective contact of the reacting gases with a turbulent fluid bed of catalyst containing large quantities of solid metal particles relative to a minor amount of metal oxide, said metal oxide representing less than 30% of the total solid present, reacting said hydrocarbon with said carbon dioxide and steam in the presence of said catalyst, and recovering a product gas consisting essentially of carbon monoxide and hydrogen.

10. The method according to claim 9 in which heat is supplied to the fluid bed of catalyst within an externally unheated reaction zone by continually withdrawing a portion of said metal-containing solid particles from the reaction zone and introducing said particles together with a stream of oxidizing gas into a turbulent fluid bed maintained in a separate oxidation zone, absorbing the heat evolved in said oxidation zone in a heat transfer medium maintained in a confined stream within said turbulent fluid bed, continuously withdrawing hot metal oxide from said oxidation zone for said hydrocarbon gas reaction and simultaneously passing said transfer medium to a heat transferring path confined within the turbulent solid in said reaction zone, whereby the temperature of the solid within said reaction zone is maintained at the desired level.

WARREN K. LEWIS.
EDWIN R. GILLILAND.

References Cited in the file of this patent

UNITED STATES PATENTS

| Number | Name | Date |
| --- | --- | --- |
| 1,899,184 | De Simo | Feb. 28, 1933 |
| 2,331,433 | Simpson et al. | Oct. 12, 1943 |
| 2,362,296 | Murphree et al. | Nov. 7, 1944 |
| 2,425,754 | Murphree et al. | Aug. 19, 1947 |
| 2,490,986 | Symonds | Dec. 13, 1949 |
| 2,506,542 | Caldwell, Jr. et al. | May 2, 1950 |
| 2,538,235 | Coffey | Jan. 16, 1951 |